United States Patent [19]

Fung et al.

[11] 4,145,314

[45] Mar. 20, 1979

[54] PREPARATION OF HIGHLY DISPERSED SUPPORTED GROUP VIII METAL CATALYSTS AND THE REDISPERSION OF SINTERED OR AGGLOMERATED SUPPORTED GROUP VIII METAL CATALYSTS BY THE ADDITION OF PHOSPHORUS

[75] Inventors: Shun C. Fung, Edison; Yen-Chi Pan, Westfield, both of N.J.

[73] Assignee: Exxon Research & Engineering Co., Florham Park, N.J.

[21] Appl. No.: 807,521

[22] Filed: Jun. 17, 1977

[51] Int. Cl.$^2$ .................... B01J 27/14; B01J 27/24; B01J 37/00
[52] U.S. Cl. .................... 252/437; 252/435; 252/438; 252/425.3; 429/40; 429/44
[58] Field of Search ............ 252/435, 437, 438, 425.3, 252/472, 447, 464, 456, 455 R, 455 Z; 429/40, 44

[56] References Cited

U.S. PATENT DOCUMENTS

| | | | |
|---|---|---|---|
| 2,890,167 | 6/1959 | Haensel | 252/435 X |
| 2,983,997 | 5/1961 | Schmeckenbecher | 252/472 X |
| 3,179,694 | 4/1965 | Eygen et al. | 252/472 X |
| 3,236,693 | 2/1966 | Caesar | 429/44 X |
| 3,411,953 | 11/1968 | Lanson et al. | 252/425.3 |
| 3,448,165 | 6/1969 | Bloch | 252/464 X |
| 3,784,483 | 1/1974 | Cichowski et al. | 252/437 |
| 3,792,086 | 2/1974 | Frank et al. | 252/435 X |
| 3,884,798 | 5/1975 | Hilfman | 252/437 X |
| 3,961,987 | 6/1976 | Mund et al. | 429/44 |

*Primary Examiner*—Delbert E. Gantz
*Assistant Examiner*—William G. Wright
*Attorney, Agent, or Firm*—E. A. Forzano; J. J. Allocca

[57] ABSTRACT

The instant invention relates to a method of preparing highly dispersed supported Group VIII metal catalysts. The instant invention further relates to the redispersion of sintered or agglomerated supported Group VIII metal catalysts. The process comprises the formation of supported Group VIII metal-phosphorus intermediate compounds followed by the treatment of these supported Group VIII metal-phosphorus compounds in an inert atmosphere at a temperature in the range of about 400° C. to about 750° C., preferably, about 550° C. to about 700° C., most preferably from 630°–700° C. The composition resultant from the dispersion heating step will form the highly dispersed, supported Group VIII metal catalysts by decomposition when reacting with an oxygen containing atmosphere, e.g. air, or reacting with water.

49 Claims, No Drawings

PREPARATION OF HIGHLY DISPERSED SUPPORTED GROUP VIII METAL CATALYSTS AND THE REDISPERSION OF SINTERED OR AGGLOMERATED SUPPORTED GROUP VIII METAL CATALYSTS BY THE ADDITION OF PHOSPHORUS

BRIEF DESCRIPTION OF THE INVENTION

The instant invention relates to a method of preparing highly dispersed supported Group VIII metal catalysts. The instant invention further relates to the redispersion of sintered or agglomerated supported Group VIII metal catalysts. The process comprises the formation of supported Group VIII metal-phosphorus intermediate compounds followed by the treatment of these supported Group VIII metal-phosphorus compounds in an inert atmosphere at a temperature in the range of about 400° C. to about 750° C., preferably, about 550° C. to about 700° C., most preferably from 630°–700° C. The composition resultant from the dispersion heating step will form the highly dispersed, supported Group VIII metal catalysts by decomposition when reacting with an oxygen containing atmosphere, e.g. air, or reacting with water.

For the instant process the Group VIII metals and phosphorus can be deposited on the support by any method known in the art. The phosphorus can be present on the support any time before the formation of the Group VIII metal-phosphorus compound intermediate, i.e. before, during, or after the metal deposition.

The Group VIII metal can be present in said catalyst from about 0.1 to about 30 wt. % of total catalyst weight. The most preferred Group VIII metal is platinum and the most preferred Group VIII metal-phosphorus compound intermediate is $PtP_2$. The amount of phosphorus which may be added may range from about 0.1 to about 33 wt. % of total catalyst weight.

The supports are selected from the group consisting of carbon, alumina, silica, silica-alumina, zeolite, kieselguhr, vermiculite, the refractory oxides of Group IVb and Vb transition metals and mixtures thereof. A preferred support is carbon.

DESCRIPTION OF PRIOR ART

U.S. Pat. No. 3,134,732 teaches that noble metal hydrocarbon conversion catalysts may be reactivated, after burning off carbonaceous deposits, by contacting said catalysts with chlorine gas at a temperature of from 60° F. (~15° C.) to 1250° F. (~677° C.) for a time sufficient to restore said catalyst to initial activity. Mixtures of chlorine gases with inert gases or oxygen are taught to be equivalent to 100% chlorine so long as an amount of chlorine equal to from 0.1 to 10% by weight catalyst is contacted with said catalyst. Further inventions in this area include U.S. Pat. No. 3,020,240 which teaches the use of chlorine and an optimum of 20 mole % of oxygen in a process for reactivating catalysts, and U.S. Pat. No. 3,243,384 which teaches the use of steam, air and chlorine mixtures in regenerating or activating a platinum on alumina catalyst. All of the above patents are mainly interested in platinum as the catalyst metal and mention of other catalyst metals is merely incidental.

U.S. Pat. No. 3,148,299 discloses the importance of maintaining high metal surface areas in platinum, palladium or rhodium on alumina catalysts for hydrocarbon conversions. The high metal areas are achieved by regenerating the catalyst in the presence of a chlorine in air mixture to restore metal surface area (redispersion of the metal).

It is believed that the instant invention is neither suggested nor anticipated by the prior art.

The instant invention does not utilize chlorine gas or chlorine gas mixtures to redisperse supported metal catalysts. Phosphorus is utilized, for the formation of Group VIII metal-phosphorus intermediates, which are heated in an inert atmosphere at elevated temperatures. The resultant composition is decomposed in air or water, as described, below, to obtain the supported Group VIII metal catalyst of increased dispersion.

DETAILED DESCRIPTION OF THE INVENTION

The instant invention relates to a method of preparing highly dispersed supported Group VIII metal catalysts. The instant invention further relates to the redispersion of sintered or agglomerated supported Group VIII metal catalysts.

The instant process comprises the formation of supported Group VIII metal-phosphorus compounds followed by the treatment of these supported Group VIII metal-phosphorus compounds in an inert atmosphere at a temperature in the range of about 400° C., to about 750° C., preferably about 550° C. to about 700° C., most preferably from 630° C. to 700° C., for a time sufficient to disperse the Group VIII metal-phosphorus compounds on said support. A decomposition step forms the highly dispersed support metal. The support which may be used with the instant invention is a high area solid support selected from the group consisting of carbon, alumina, silica, silica-alumina, zeolite, kieselguhr, vermiculite, and the refractory oxides of Group IVb and Vb transition metals and mixtures thereof. Preferably the supports are selected from the group consisting of carbon, silica, alumina, silica-alumina, and mixtures thereof. Most preferably the support is carbon. The carbon support may be crystalline, i.e. graphite or amorphous, preferably amorphous. Further, the carbon support may be activated or non-activated, preferably activated. The surface areas of the supports may range from about 10 to about 2000 $m^2/g$, preferably from about 40 to about 1500 $m^2/g$.

For the instant process the Group VIII metals and the phosphorus may be deposited on the support by any method known in the art. For example, Group VII metal may be deposited by impregnation from a solution of a water soluble Group VIII metal salt. A water soluble Group VIII metal salt may also be deposited an a support by the ion exchange method.

As noted above, the phosphorus may also be deposited on the support by any method known in the art. For example, the phosphorus may be impregnated by the incipient wetness technique of a water soluble phosphate salt or vapor deposition of elemental phosphorus, preferably red phosphorus. A preferred example of a water soluble phosphate salt is ammonium phosphate. In the case of carbon, the phosphorous may be impregnated or deposited upon the support by using the phosphoric acid activation technique. A number of commercially available activated carbon supports contain phosphorus deposited in this way. For example, North American Corporation's P-100 carbon catalyst contains about 3.5 wt. % phosphorus. The American Norit Corporation produces Polycarbon C, a carbon catalyst containing about 2.5 wt. % phosphorus deposited in this manner. Copending application Ser. No. 807,519 filed June 17, 1977 by Shun Chong Fung, entitled "Highly Dispersed Supported Group VIII Metal-Phosphorus Compounds and Highly Dispersed, Supported Group VIII Metal-Arsenic, and a Process for Making Said Compounds", which describes both the various methods of impregnation for Group VIII metals and phosphorus on supports as well as other information helpful in carrying out the instant process, is hereby incorporated by reference.

The phosphorus may be added to the support at any time before the formation of the Group VIII metal-phosphorus compound intermediate. That is, the phosphorus may be present on the support before the deposition of the Group VIII metal, during or after the metal deposition — whichever is compatible with the deposition technique utilized for each component. Further, the phosphorus may be added even after the catalyst becomes sintered or agglomerated through use, whereby said catalyst can be redispersed by the process of the instant invention. It is crucial to the process of the instant invention that a Group VIII metal-phosphorus compound be formed either before or during the dispersion heating step. The Group VIII metal-phosphorus compounds utilized in conjunction with the instant invention are binary compounds, that is, these compounds contain two components, a Group VIII metal and phosphorus. As is well known to those in the art, there is a wide variety of Group VIII metal-phosphorus binary compounds. The process is operable with any Group VIII metal-phosphorus compound or mixtures thereof known in the art. These include $FeP_2$, $Fe_3P$, $Ru_2P$, $RuP_2$, $Rh_2P$, $RhP_2$, $OsP_2$, $Ir_2P$, $IRP_2$, $Pd_3P$, $Pd_2P$, $PdP_2$, $CoP_3$, $CoP$, $Ni_3P$, $Ni_2P$, $NiP_2$, $PtP_2$. The most preferred Group VIII metal-phosphorus compound is $PtP_2$.

The process is compatible with any known method of forming supported Group VIII metal-phosphorus compounds. Ser. No. 807,519, filed June 17, 1977, heretofore incorporated by reference, describes a number of methods which form supported Group VIII phosphorus compounds.

Although it is preferable to form the supported Group VIII metal-phosphorus compound(s) prior to the dispersion heating step, it is also possible to form the Group VIII-metal-phosphorus intermediate during the dispersion heating step. For example, a support impregnated with both elemental phosphorus and a Group VIII metal will form the Group VIII metal-phosphorus intermediates during the heating step.

One skilled in the art will be able to choose the potential Group VIII metal and phosphorus containing components that will form the Group VIII metal-phosphorus intermediates during the heating dispersion step if so desired.

The supported Group VIII metal-phosphorus compound(s) formed either before or during the dispersion heating step must be heated in said step in an inert atmosphere at a temperature in the range of about 400° C. to about 750° C., preferably from about 550° C. to about 700° C. for a time sufficient to disperse the Group VIII metal on the support. The inert atmosphere is preferably He. Those skilled in the art will be able to choose other inert gaseous atmospheres compatible with the instant invention. The basic requirement of said gas is that it must not chemically react with any of the catalyst components under the conditions of the heating step. The duration of the heating step depends primarily upon two parameters: (1) the Group VIII metal particle size before the heating step and (2) the Group VIII metal particle size desired from the process of the invention. Thus, the greater the difference in the metal particle sizes before and after the process, the longer the duration of the heating step. Generally, heating the catalyst components from about 1 to about 6 hours, preferably from about 1 to about 4 hours will cause a substantial reduction in the Group VIII metal crystallite size. The heating step is operable at all pressures from about 0.1 to about 10 atmospheres, preferably from about 1.0 to about 2.0 atmospheres.

Through the process of the instant invention it is possible to form Group VIII metal crystallites of less than about 100Å, preferably from about 30Å to about 60Å, most preferably from about 30Å to atomic dispersion.

After the dispersion heating step, the highly dispersed, supported Group VIII metal is formed by decomposing the composition resultant from the dispersion-heating step by reacting it with an oxygen-containing atmosphere, e.g. air, or reacting it with water. When decomposing by reaction said composition with an oxygen-containing atmosphere, the temperature may range from about 0° C. to about 150° C., preferably from about 20° C. to about 100° C., most preferably from about 25° C. to about 40° C. The decomposition in oxygen-containing atmosphere may be run at any of the pressure ranges listed above for the heating step. The decomposition in air at elevated temperature may take several hours to complete at room temperature. The decomposition in air may take as long as ten days or more.

The water decomposition step comprises mixing the composition resulting from the dispersion heating step with sufficient water to make a dilute solution. The water decomposition step may be performed at a temperature in the range of about 20° C. to about 100° C., preferably from 20° C. to about 40° C. Water decomposition at room temperature may take from about 2 to about 24 hours. This catalyst may be air dried. Preferably, calcining the water decomposed catalyst in air at temperatures of about 100° C. will insure complete decomposition to the highly dispersed, supported Group VIII metal.

The instant process is applicable for any of the Group VIII metals of the Periodic Table of the Elements, namely Fe, Co, Ni, Ru, Rh, Pd, Os, Ir and Pt; preferably, the Group VIII noble metals; and most preferably Pt. The metal loading of the Group VIII metal component in the catalysts dispersed by the instant invention range from about 0.1% to about 30% by weight of the total catalyst, preferably from about 1% to about 20% by weight of the total catalyst.

The amount of phosphorus component in the catalysts dispersed by the instant invention primarily depends upon the metal to be dispersed, the amount of such metal, and the metal-phosphorus compounds that may be formed during the process. Thus, one may calculate the stoichiometric amount of phosphorus required for the instant invention. Excess phosphorus will not inhibit the instant invention. Generally, the phosphorus will range from about 0.1 to about 33 wt. % of the total catalyst, preferably from about 0.1 to about 15 wt. % of the total catalyst, most preferably from about 0.3 to about 7.0 wt. % of the total catalyst.

The Group VIII metals dispersed on their supports by the instant invention have a number of known uses in the catalyst art. For example, Pt/carbon is useful as an electrode in fuel cells. The increase in dispersion of such supported Group VIII metals enhances their activity over their corresponding bulk phase catalysts.

The following examples are presented to illustrate and not limit the instant invention. All examples were performed at ambient pressure as a matter of convenience.

EXAMPLE 1

In this example a water-soluble platinum salt was impregnated by the incipient wetness technique on a high surface area carbon support. The carbon support contained phosphorus which had been introduced into the support by the manufacturer during the phosphoric acid activation process. This support, P-100, a commercially available support from the North American Corporation, contained about 3.5 wt. % phosphorus. Aqueous chloroplatinic acid was used as an impregnating medium with sufficient solution to produce a uniform, moist catalyst mass during the impregnation step. About 10 wt. % Pt was deposited onto the support during the impregnation step.

The moist catalyst mass was dried in air at 120° C. prior to reduction in a modified quartz tube furnace. Reduction was carried out for 1.5 hours at 450° C. with a flowing de-oxygenated and dried hydrogen stream. This reduced catalyst was then calcined in air at 220° C. to produce Pt crystals. This catalyst was then treated under He at 630° C. for 2½ hours. The composition resultant from the heating-dispersion step was decomposed in air at room temperature for a period of several days. The Electron Micrograph technique was utilized to detect the Pt crystallite sizes. Table 1 summarizes the data obtained.

It can be seen from this data that the Pt crystallite size was reduced to about 20Å after the process of the instant invention. Small flat clusters were indicated by the Electron Micrograph.

TABLE 1

CRYSTALLITE SIZE OF Pt SUPPORTED ON A PHOSPHORUS-CONTAINING CARBON SUPPORT

| Catalyst | Treatment Conditions | Pt Crystallite Size by Electron Micrograph |
|---|---|---|
| 10% Pt/P-100 | Calcined in air at 220° C. | 30Å |
| 10% P/P-100 | Under He at 630° C. | small flat clusters (~20Å) |

EXAMPLE 2

In this example another phosphorus-containing carbon support is impregnated with Pt, reduced for two hours and calcined at 220° C. using the method of Example 1. Again, the carbon support contained phosphorus which had been introduced into the support by the manufacturer during the phosphoric acid activation process. This support, Nuchar, a commercially available support from the Westveco Company, contained about 2.5 wt. % phosphorus. About 10 wt. % Pt was deposited onto the support during the impregnation step. The Pt crystallite size was determined by X-ray diffraction to be 51Å.

Six grams of catalyst was made by the above method. One gram of the catalyst was treated under a He atmosphere at 650° C. for 1½ hours. Decomposition of the resultant composition is detailed in Table 2. The Pt crystallite size was determined to be 42Å by X-ray diffraction. The data is summarized in Table 2.

TABLE 2

CRYSTALLITE SIZE OF Pt SUPPORTED ON A PHOSPHORUS-CONTAINING CARBON SUPPORT

| Catalyst | Treatment Conditions | Pt Crystallite Size by X-ray |
|---|---|---|
| 10% Pt/Nuchar | Calcined in air at 220° C. | 51Å |
| 10% Pt/Nuchar | Under He at 650° C. Decomposition in air at a temperature of about 25° C. for a time period of 3 days | 42Å |

EXAMPLE 3

The ability of phorphorus containing carbon to redispersed agglomerated Pt crystallites was further demonstrated by mixing a phosphorus containing carbon, P-100, with a carbon black supported Pt catalyst and heat treating the mixture at 630° C. under He for 2 hrs. The Pt catalyst was formed by the impregnation and reduction techniques described in Example 1. The Pt crystallite in the original catalyst was 59Å as detected by X-ray diffraction. The composition resultant from the heat dispersion step was left in a bottle at room temperature for 20 days. The X-ray spectrum of the catalyst showed broad Pt peaks corresponded to 23Å crystallites. A control experiment without the addition of P-100 carbon showed that Pt crystallite size remained at 59Å all through the experiment (see Table 3).

TABLE 3

REDISPERSION OF Pt CRYSTALLITES

| Catalyst | Wt. % P | Fresh Catalyst | Helium Treat at 630° C., 2 hrs. | Room Temperature Decomposition in Air |
|---|---|---|---|---|
| 10% Pt/XC-72 | None | 59Å Well defined Pt peaks | 59Å Well defined Pt peaks | 59Å Well defined Pt peaks |
| 10% Pt/XC-72 +P-100 Mixture (1:2) | 2.3 | 59Å Well defined Pt peaks | Broad peaks | 23Å Broad peaks |

What is claimed is:

1. A process for preparing Group VIII noble metal compositions, wherein the Group VIII noble metal particle size is less than 100Å, supported on a high surface area solid support selected from the group consisting of carbon, alumina, silica, silica-alumina, zeolite, kieselguhr, vermiculite, the refractory oxides of Group IVb and Vb transition metals, and mixtures thereof, wherein the process consists of the steps of:

(a) depositing onto said support at least one Group VIII noble metal by impregnating said support with a water soluble Group VIII noble metal salt selected from the group consisting of Group VIII noble metal chloride. Group VIII noble metal nitrate and Group VIII noble metal ammonia complexes and reducing said Group VIII noble metal; salt to the Group VIII noble metal;

(b) depositing onto said support elemental phosphorus in an amount sufficient to result in a phosphorus-Group VIII noble metal atomic ratio of about 0.3 to about 3.0, wherein steps (a) and (b) may be performed sequentially in any order;

(c) heating said composition resulting from the completion of steps (a) and (b) in an inert atmosphere at a temperature in the range of about 400° C. to about 750° C., and a pressure in the range of about 0.1 atmospheres to about 10 atmospheres, for a time sufficient to form supported Group VIII noble metal-phosphorus compounds;

(d) decomposing said composition resulting from the completion of step (c) by either reacting said composition with an oxygen-containing atmosphere at a temperature in the range of about 0° C. to about 150° C., or reacting said composition with water at a temperature in the range of about 20° C. to about 100° C.

2. The process of claim 1 wherein said water soluble Group VIII noble metal salts are selected from the group consisting of water soluble platinum chloride, platinum nitrate and platinum ammonia complexes.

3. The process of claim 2 wherein said water soluble Group metal salt is $H_2PtCl_6$ and said solution of $H_2PtCl_6$ is an aqueous solution.

4. The process of claim 1 wherein said high surface area support is selected from the group consisting of carbon, alumina, silica-alumina, and mixtures thereof, and the surface area of said support ranges from about 10 to about 2000 $m^2/g$.

5. The process of claim 3 wherein said high surface area support is carbon.

6. The process of claim 1 wherein said elemental phosphorus is deposited onto said support by impregnating onto said support a water soluble phosphorus salt and subsequently reducing said impregnated phosphorus salt.

7. The process of claim 6 wherein said water soluble phosphate salt is ammonium phosphate and said solution of ammonium phosphate is an aqueous solution.

8. The process of claim 1 wherein said elemental phosphorus is deposited onto said support by the vapor deposition method in a vacuum.

9. The process of claim 8 wherein said support is impregnated with red phosphorus.

10. The process of claim 1 wherein said inert atmosphere in step (c) is He.

11. The process of claim 1 wherein said phosphorus to Group VIII metal atomic ratio is above about 2.0.

12. The process of claim 1 wherein said phosphorus to Group VIII metal atomic ratio is above about 1.0.

13. The process of claim 1 wherein the temperature of step (c) ranges from about 550° C. to about 700° C., and the pressure of step (c) ranges from about 1.0 atm. to about 2.0 atm.

14. The process of claim 1 wherein the temperature of the decomposition in an oxygen-containing atmosphere ranges from about 25° C. to about 40° C., and the temperature of the decomposition in water ranges from about 20° C. to about 40° C.

15. The process of claim 1 wherein said decomposition step (d) is performed by exposing to air at room temperature said composition resulting from the completion of step (c).

16. The process of claim 1 wherein said heating step (c) is performed for 1–6 hours.

17. A process for preparing, supported Group VIII metal compositions, wherein the Group VIII metal particle size is less than 100 Å, from the corresponding supported Group VIII metal compositions possessing low degrees of dispersion, wherein said support is a high surface area solid support selected from the group consisting of carbon, alumina, silica, silica-alumina, zeolite, kieselguhr, vermiculite, the refractory oxides of Group IVb and Vb transition metals, and mixtures thereof, wherein the process comprises the steps of:

(a) heating said supported Group VIII metal composition of low dispersion in the presence of phosphorus in an inert atmosphere at a temperature in the range of about 400° C. to about 750° C. and a pressure in the range of about 10 atmospheres to about 0.1 atmospheres, for a time sufficient to form highly dispersed, supported Group VIII metal-phosphorus compounds; and (b) decomposing said composition resulting from the completion of step (a) by either reacting said composition with an oxygen-containing atmosphere at a temperature in the range of about 0° C. to about 150° C. or reacting said composition with water at a temperature in the range of about 20° C. to about 100° C.

18. The process of claim 17 wherein phosphorus is deposited onto said support by impregnating onto said support a water soluble phosphorus salt and subsequently reducing said impregnated phosphorus salt.

19. The process of claim 18 wherein said water soluble phosphate salt is ammonium phosphate and said solution of ammonium phosphate is an aqueous solution.

20. The process of claim 17 wherein elemental phosphorus is deposited onto said support by the vapor deposition method in a vacuum.

21. The process of claim 20 wherein said support is impregnated with red phosphorus.

22. The process of claim 17 wherein said high surface area support is selected from the group consisting of carbon, alumina, silica-alumina, and mixtures thereof, and the surface area of said support ranges from about 10 to about 2000 $m^2/g$.

23. The process of claim 22 wherein said high surface area support is carbon.

24. The process of claim 17 wherein said Group VIII metal is selected from the group consisting of Group VIII noble metals and mixtures thereof.

25. The process of claim 17 wherein said Group VIII metal is Pt.

26. The process of claim 23 wherein said Group VIII metal is Pt.

27. The process of claim 17 where the inert atmosphere of step (a) is He.

28. The process of claim 18 wherein said phosphorus is deposited in an amount sufficient to result in a phosphorus/Group VIII metal atomic ratio of about 0.3 to about 3.0.

29. The process of claim 28 wherein said phosphorus to Group VIII metal atomic ratio is above about 2.0.

30. The process of claim 29 wherein said phosphorus to Group VIII metal atomic ratio is above about 1.0.

31. The process of claim 20 wherein said phosphorus is deposited in an amount sufficient to result in a phosphorus/Group VIII metal atomic ratio of about 0.3 to about 3.0.

32. The process of claim 31 wherein said phosphorus to Group VIII metal atomic ratio is above about 2.0.

33. The process of claim 32 wherein said phosphorus to Group VIII metal atomic ratio is above about 1.0.

34. The process of claim 17 wherein the temperature of step (a) ranges from above 550° C. to about 700° C., and the pressure of step (a) ranges from about 1.0 atm. to about 2.0 atm.

35. The process of claim 17 wherein the temperature of the decomposition in an oxygen-containing atmosphere ranges from about 25° C. to about 40° C., and the temperature of the decomposition in water ranges from about 20° C. to about 40° C.

36. The process of claim 17 wherein said decomposition step (b) is performed by exposing to air at room temperature said composition resulting from the completion of step (a).

37. The process of claim 17 wherein said heating step (a) is performed for 1–6 hours.

38. A process for preparing supported Group VIII noble metal compositions wherein the Group VIII noble metal particle size is less than 100° Å, wherein the support is a high surface area solid support selected from the group consisting of carbon, alumina, silica-alumina, zeolite, kieselguhr, vermiculite, the refractory oxides of Group IVb and Vb transition metals, and mixtures thereof, wherein said support contains elemental phosphorus, wherein the process consists of the steps of:
 (a) depositing onto said support at least one Group VIII noble metal, by impregnating said support with a water soluble Group VIII noble metal salt selected from the group consisting of Group VIII noble metal chloride, Group VIII noble metal nitrate and Group VIII noble metal ammonia complexes and reducing said Group VIII noble metal salt to the Group VIII noble metal, in an amount sufficient to result in a phosphorus/Group VIII noble metal atomic ratio of about 0.3 to about 3.0;
 (b) heating the composition resulting from step (a) in an inert atmosphere at a temperature in the range of 400° C. to 750° C. and a pressure in the range of about 10 atmospheres to about 0.1 atmospheres, for a time sufficient to form the supported Group VIII noble metal-phosphorus compounds; and
 (c) decomposing said combination resulting from the completion of step (b) by either reacting said composition with an oxygen-containing atmosphere at a temperature in the range of about 0° C. to about 150° C. or reacting said composition with water at a temperature in the range of about 20° C. to about 100° C.

39. The process of claim 38 wherein said water soluble Group VIII metal salts are selected from the group consisting of water soluble platinum cloride, platinum nitrate and platinum ammonia complexes.

40. The process of claim 43 wherein said water soluble Group VIII metal salt is $H_2PtCl_6$ and said solution of $H_2PtCl_6$ is an aqueous solution.

41. The process of claim 40 wherein said high surface area support is activated carbon.

42. The process of claim 38 wherein said inert atmosphere in step (b) is He.

43. The process of claim 38 wherein said phosphorus to Group VIII metal atomic ratio is above about 2.0.

44. The process of claim 43 wherein said phosphorus to Group VIII metal atomic is above about 1.0.

45. The process of claim 38 wherein the temperature of step (b) ranges from about 550° C. to about 700° C., and the pressure of step (b) ranges from about 1.0 atm. to about 2.0. atm.

46. The process of claim 38 wherein the temperature of the decomposition in an oxygen-containing atmosphere ranges from about 25° C. to about 40° C., and the temperature of the decomposition in water ranges from about 20° C. to about 40° C.

47. The process of claim 38 wherein said decomposition step (c) is performed by exposing to air at room temperature said composition resulting from the completion of step (b).

48. The process of claim 36 wherein said heating step (b) is performed for 1–6 hours.

49. A process for preparing supported Group VIII metal compositions, wherein the Group VIII metal particle size is less than 100 Å, from the corresponding supported Group VIII metal-phosphorus compounds possessing low degrees of dispersion, wherein said support is a high surface area solid support selected from the group consisting of carbon, alumina, silica, silica-alumina, zeolite, kieselguhr, vermiculite, the refractory oxides of Group IVb and Vb transition metals, and mixtures thereof, wherein the process comprises the steps of:
 (a) heating said supported Group VIII metal-phosphorus compounds of low dispersion in an inert atmosphere at a temperature in the range of about 400° C. to about 750° C. and a pressure in the range of about 10 atmospheres to about 0.1 atmospheres;
 (b) decomposing said composition resulting from the completion of step (a) by either reacting said composition with an oxygen-containing atmosphere at a temperature in the range of about 0° C. to about 150° C. or reacting said composition with water at a temperature in the range of about 20° C. to about 100° C.

* * * * *